United States Patent
Astrom et al.

(10) Patent No.: US 11,190,303 B2
(45) Date of Patent: Nov. 30, 2021

(54) ELECTRONIC TRANSCEIVER DEVICE, METHOD AND COMPUTER PROGRAM FOR DECODING CONTROL INFORMATION

(71) Applicant: Telefonaktiebolaget LM Ericsson (publ), Stockholm (SE)

(72) Inventors: Magnus Astrom, Lund (SE); Andres Reial, Malmo (SE); Henrik Sahlin, Molnlycke (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/637,266

(22) PCT Filed: Jul. 12, 2018

(86) PCT No.: PCT/EP2018/068924
§ 371 (c)(1),
(2) Date: Feb. 6, 2020

(87) PCT Pub. No.: WO2019/034337
PCT Pub. Date: Feb. 21, 2019

(65) Prior Publication Data
US 2020/0186297 A1   Jun. 11, 2020

Related U.S. Application Data

(60) Provisional application No. 62/545,851, filed on Aug. 15, 2017.

(51) Int. Cl.
*H04L 1/18* (2006.01)
*H04L 1/08* (2006.01)
*H04W 56/00* (2009.01)

(52) U.S. Cl.
CPC .............. *H04L 1/1845* (2013.01); *H04L 1/08* (2013.01); *H04L 1/189* (2013.01); *H04W 56/001* (2013.01)

(58) Field of Classification Search
CPC ......... H04L 1/08; H04L 1/1845; H04L 1/189; H04W 56/001
See application file for complete search history.

(56) References Cited

U.S. PATENT DOCUMENTS 6,671,340 B1   12/2003   Kroeger et al.
2003/0195017 A1   10/2003   Chen et al.
(Continued)

FOREIGN PATENT DOCUMENTS

| WO | 2013077998 A1 | 5/2013 |
| WO | 2016141961 A1 | 9/2016 |
| WO | 2016173922 A1 | 11/2016 |

OTHER PUBLICATIONS

PCT International Search Report, dated Oct. 22, 2018, in connection with International Application No. PCT/EP2018/068924, all pages.
(Continued)

*Primary Examiner* — Gary Mui
(74) *Attorney, Agent, or Firm* — Leffler Intellectual Property Law, PLLC

(57) ABSTRACT

An electronic transceiver device is arranged to operate in a cellular communication system. The cellular communication system has a network node arranged to transmit control information by repeating at least a part of the control information. The electronic transceiver device comprises a receiver arranged to receive signals from the network node including signals comprising the control information. The signals comprise a first signal and a second signal grouped at repeating time instances. Information from the decoded first signal enables identifying the second signals when the receiver is able to decode at least the first signal. The receiver is configured to receive the first signal and the second signal provided at a first time instance, and to receive the first signal and the second signal at a second time instance. The electronic transceiver device further comprises (Continued)

a memory arranged to store at least information received in the second signals, and a signal processor arranged to form hypotheses of differences in the received information at the first and second time instances of the second signals for soft-combining the information of the second signals. Upon a hypothesis indicating successful soft-combining of the second signals of the first and second time instances, the signal processor is arranged to decode control information carried by the second signals.

17 Claims, 4 Drawing Sheets

(56) References Cited

U.S. PATENT DOCUMENTS

| | | | |
|---|---|---|---|
| 2005/0025076 A1* | 2/2005 | Chaudhuri | H04L 1/20 370/310 |
| 2007/0189282 A1 | 8/2007 | Lohr et al. | |
| 2007/0266303 A1 | 11/2007 | Shih | |
| 2009/0003473 A1 | 1/2009 | Cho et al. | |
| 2009/0116449 A1 | 5/2009 | Kishiyama et al. | |
| 2010/0074448 A1 | 3/2010 | Park et al. | |
| 2011/0164707 A1* | 7/2011 | Luo | H04L 1/0045 375/341 |
| 2011/0228883 A1* | 9/2011 | Liu | H04L 1/0045 375/341 |
| 2012/0258754 A1 | 10/2012 | Banu et al. | |
| 2016/0190707 A1* | 6/2016 | Park | H01Q 3/24 370/334 |
| 2016/0227501 A1 | 8/2016 | Shen et al. | |
| 2017/0127367 A1 | 5/2017 | Axnas et al. | |
| 2017/0171854 A1 | 6/2017 | Guzelgoz et al. | |
| 2018/0091173 A1* | 3/2018 | Axmon | H04L 1/0059 |
| 2018/0206244 A1 | 7/2018 | Yang et al. | |
| 2018/0241416 A1* | 8/2018 | Axmon | H03M 13/093 |
| 2018/0242231 A1 | 8/2018 | Reial et al. | |
| 2018/0279243 A1* | 9/2018 | Sadiq | H04L 1/189 |
| 2019/0349126 A1* | 11/2019 | Andgart | H04L 1/0038 |
| 2020/0100214 A1* | 3/2020 | Wei | H04L 1/0041 |

OTHER PUBLICATIONS

PCT Written Opinion, dated Oct. 22, 2018, in connection with International Application No. PCT/EP2018/068924, all pages.

3GPP TSG RAN WG1 Meeting #89, R1-1708162, Hangzhou, China, May 15-19, 2017, Huawei, HiSilicon, "Discussion and evaluation on NR-PBCH design", 8 pages.

3GPP TSG RAN WG1 Meeting #89, R1-1708328, Hangzhou, P.R. China, May 15-19, 2017, ITL, "NR-PBCH design aspects", 10 pages.

European Search Report, dated Jul. 31, 2017, in connection with European Application No. EP 17156708, all pages.

3GPP TSG RAN WG1 Meeting #88, R1-1703094, Athens, Greece, Feb. 13-17, 2017, Nokia, Alcatel-Lucent Shanghai Bell, NR-PBCH Design, 10 pages.

3GPP TSG RAN WG1 Meeting #88, R1-1701695, Athens, Greece, Feb. 13-17, 2017, Huawei, HiSilicon, CSI-RS design for CSI acquisition, 7 pages.

Non-Final Office Action, dated May 7, 2018, in connection with U.S. Appl. No. 15/456,557, 19 pages.

Final Office Action, dated Sep. 19, 2018, in connection with U.S. Appl. No. 15/456,557, 10 pages.

* cited by examiner

ELECTRONIC TRANSCEIVER DEVICE, METHOD AND COMPUTER PROGRAM FOR DECODING CONTROL INFORMATION

CROSS-REFERENCE TO RELATED APPLICATIONS

This is a § 371 national stage of PCT/EP2018/068924, filed Jul. 12, 2018, which claims the benefit of U.S. Provisional Application No. 62/545,581, filed Aug. 15, 2017. Both of these applications are hereby incorporated herein by reference in their entireties.

TECHNICAL FIELD

The present disclosure generally relates to an electronic transceiver device and method and computer program therefor. In particular, the present disclosure relates to soft-combining of signals provided from a network node.

BACKGROUND

When an electronic transceiver device, such as User Equipment (UE), wishes to connect to a wireless cellular communication system, for example after power-on or when waking up after an extended sleep period, it goes through an initial-access procedure. The first step of this procedure is typically that the electronic transceiver device searches for and detects a synchronization signal that is regularly broadcast by the network access nodes. After successful time-frequency alignment, the electronic transceiver device may listen for additional information from the network, e.g. so-called system information, and/or respond with a request to join the network. This is often referred to as physical random access channel message, or Physical Random Access Channel (PRACH) message). The electronic transceiver device is typically not allowed to send the request to join at an arbitrary time, since that could conflict with other transmissions in the system, but should rather send it at a predefined time interval after the downlink signal was received.

Thus, in order to connect to the network, the device needs to acquire network synchronisation and obtain essential system information. Synchronisation signals are used for adjusting the frequency of the device relative the network, and for finding the proper timing of the received signal from the network. In the New Radio (NR), the synchronization and access procedure may involve several signals, as briefly elucidated below.

A Primary Synchronization Signal (PSS) allows for network detection in presence of a high initial frequency error, up to tens of ppm. Additionally, PSS provides a network timing reference. 3GPP has selected three m-sequences as PSS signals in NR. Since the use of one out of three sequences is known but the channel is unknown, the PSS is typically detected by correlation between the received signal and all of the three possible m-sequences. A correlation value above a threshold typically indicates the existence of a PSS. In order to handle initially large frequency offsets arising from an uncalibrated LO, multiple correlations may be needed for hypothesizing over multiple, different frequency errors to cover the whole range of frequency errors that result from a crystal's open loop frequency inaccuracy.

A Secondary Synchronization Signal (SSS) allows for more accurate frequency adjustments and channel estimation while at the same time providing fundamental network information, e.g. cell identity (ID). Also here m-sequences are used and detection is similar to that of PSS.

A Physical Broadcast CHannel (PBCH) provides a subset of the minimum system information for random access. It will also provide timing information within a cell, e.g. to separate timing between beams transmitted from a cell. The amount of information to fit into the PBCH is of course highly limited to keep the size and power allocation down. Furthermore, demodulation reference signals are injected in the PBCH in order to receive it properly.

A Synchronization Signal Block (SSB) as proposed for NR comprises the above signals, i.e. PSS, SSS, and PBCH. In NR, the transmission scheme may for example have a composition and structure and be provided repeatedly, as illustrated in FIG. 1. For example, two Orthogonal Frequency Division Multiplex (OFDM) symbols are reserved for PBCH transmission in NR, and PSS and SSS are defined to be 127 subcarriers wide whereas the PBCH is defined to be 288 subcarriers wide in NR.

A number of SSBs, typically rather close in time, may constitute an SS burst. A collection of SS bursts is an SS burst set, as illustrated in FIG. 2. The SS burst set is repeated periodically, say, every 20 ms. An SS burst set is transmitted periodically and the UE can, by using the SSBs in the SS burst set, determine the downlink timing, and acquire some fundamental system information from the PBCH. In idle mode the UE can expect an SS burst set transmitted once per 20 ms, while in connected mode the UE can be configured to expect SS burst sets once per 5 ms. Hence, once the UE has obtained downlink synchronization, it knows in which slots to expect SS block transmissions.

Some or all information bits in the subsequent symbols representing different SSBs may be the same, or some of them may differ. One example of embedding varying information is the inclusion of a count-down counter in the transmission to indicate the time to a PRACH transmission window. In that case, a counter value may be reduced in each OFDM symbol, while the node identity and/or access format information does not change.

Some electronic transceiver devices near the cell border may experience worse coverage and may be unable to receive the system information. Hence there is a need for an approach for improving system information detection performance in such scenarios

SUMMARY

The disclosure is based on the understanding that signals in SSBs from a network node may provide variable range at cell borders depending on different robustness of the signals. The inventors have found that by attempting to soft-combine signals from the repeated SSBs by letting information from the more robust signals, i.e. PSS and SSS, aid in combining of the less robust signals, i.e. PBCH, the range can in practice be improved. Robustness in this context means the ability to decode a weak signal, and different robustness may be caused by different encoding, modulation, power (i.e. per symbol or resource element), etc.

According to a first aspect, there is provided an electronic transceiver device arranged to operate in a cellular communication system, where the cellular communication system has a network node arranged to transmit control information by repeating at least a part of the control information, wherein the electronic transceiver device comprises a receiver arranged to receive signals from the network node including signals comprising the control information, said signals comprising a first signal and a second signal grouped at repeating time instances. Information from the decoded first signal enables identifying the second signals when the receiver is able to decode at least the first signal. The receiver is configured to receive the first signal and the second signal provided at a first time instance, and to receive the first signal and the second signal at a second time instance. The electronic transceiver device further comprises a memory arranged to store at least information received in the second signals, and a signal processor arranged to form hypotheses of differences in the received information at the first and second time instances of the second signals for soft-combining the information of the second signals. Upon a hypothesis indicating successful soft-combining of the second signals of the first and second time instances, the signal processor is arranged to decode control information carried by the second signals.

Each of the first and second time instances may correspond to a reception of a synchronisation signal block. The first signal may be a primary synchronisation signal or a secondary synchronisation signal. The second signal may be a physical broadcast channel.

The electronic transceiver device may be arranged to determine if information of the second signal is decodable from the combination of the second signals of the first and second time instances, and further arranged to receive a first signal and a second signal provided at a further time instance by the network node and form hypotheses of differences in the received information at the first, second and further time instances of the second signals for soft-combining the information of the second signals if determined that information of the second signal is not decodable from the second signals at the first and second time instances. The determination of whether decoding of the information of the second signal is enabled from the second signals at the first and second time instances may be based on a check sum.

The signal processor may be arranged to form the hypotheses by being configured to hypothesize a difference between information of the two or more of the plurality of the second signals, wherein the difference being one or more symbols of the second signals differing from corresponding symbols of the other second signals, decode the second signal, for each code word segment of a received code word of the second signals, by being arranged to determine a first metric associated with a probability that a first code word segment of a first received code word corresponds to a signal segment content, determine a second metric associated with a probability that a second code word segment of a received second code word of the second signal corresponds to the first signal segment content conditional on the difference between the second signals, and select, for the second signal, the first signal segment content or the second signal segment content based on the metrics, for the soft-combining, wherein a determination whether the soft-combining is successful is based on the metrics.

The signal processor may be arranged to form the hypotheses of differences in the received information of second signals for soft-combining the information of the second signals by being arranged to invert and soft-combine the information according to a hypothesis dependent pattern.

The respective second signals may be scaled prior combining, wherein the scaling may be based on at least one of a reception quality metric of the received second signal, and estimated channel for the received second signal.

The information from the decoded first signal at at least the first time instance may enable identifying other time instances when the first signal and the second signal are transmitted grouped at the repeating time instances.

According to a second aspect, there is provided a method performed by an electronic transceiver device arranged to operate in a cellular communication system, where the cellular communication system has a network node arranged to transmit control information by repeating at least a part of the control information. The method comprises receiving signals from the network node including signals comprising the control information, said signals comprising a first signal and a second signal grouped at repeating time instances, wherein information from the decoded first signal enables identifying the second signals when the receiver is able to decode at least the first signal. The receiving of the signals comprises receiving the first signal and the second signal provided at a first time instance, receiving the first signal and the second signal at a second time instance. The method further comprises storing at least information received in the second signals, and forming hypotheses of differences in the received information at the first and second time instances of the second signals for soft-combining the information of the second signals, and decoding control information carried by the second signals upon a hypothesis indicating successful soft-combining of the second signals of the first and second time instances.

Each of the first and second time instances may correspond to a reception of a synchronisation signal block. The first signal may be a primary synchronisation signal or a secondary synchronisation signal. The second signal may be a physical broadcast channel.

The method may comprise determining if information of the second signal is decodable from the combination of the second signals of the first and second time instances, receiving a first signal and a second signal provided at a further time instance, and forming hypotheses of differences in the received information at the first, second and further time instances of the second signals for soft-combining the information of the second signals if determined that information of the second signal is not decodable from the second signals at the first and second time instances. The determining of whether decoding of the information of the second signal is enabled from the second signals at the first and second time instances may be based on a check sum.

The forming of the hypotheses may comprise hypothesizing a difference between information of the two or more of the plurality of the second signals, the difference being one or more symbols of the second signals differing from corresponding symbols of the other second signals, decoding the second signal for each code word segment of a received code word of the second signals, wherein the decoding may comprise determining a first metric associated with a probability that a first code word segment of a first received code word corresponds to a signal segment content, determining a second metric associated with a probability that a second code word segment of a received second code word of the second signal corresponds to the first signal segment content conditional on the difference between the second signals, and selecting, for the second signal, the first signal segment content or the second signal segment content based on the metrics, for the soft-combining, wherein a determination whether the soft-combining is successful is based on the metrics.

The forming of the hypotheses of differences in the received information of second signals for soft-combining the information of the second signals may comprise inverting and soft-combining the information according to a hypothesis dependent pattern.

The method may comprise scaling the respective second signals prior combining, wherein the scaling may be based on at least one of a reception quality metric of the received second signal, and estimated channel for the received second signal.

The information from the decoded first signal at at least the first time instance may enable identifying other time instances when the first signal and the second signal are transmitted grouped at the repeating time instances.

According to a third aspect, there is provided a computer program comprising instructions which, when executed on a processor of an electronic transceiver device, causes the electronic transceiver device to perform the method according to the second aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 3:
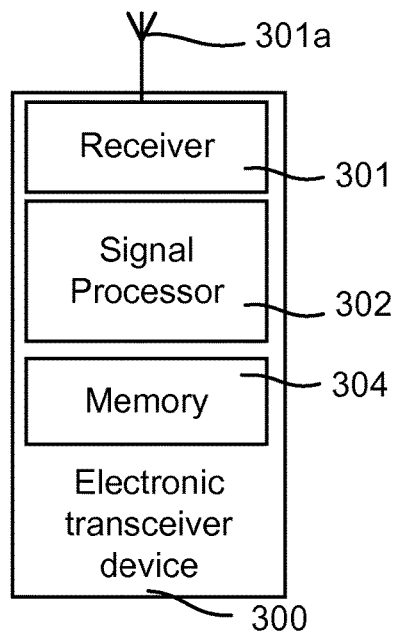
FIG. 3 is a block diagram of an electronic transceiver device according to an embodiment.

FIG. 3 schematically illustrates an electronic transceiver device 300 according to an embodiment. The electronic transceiver device 300. The electronic transceiver device 300 may be a User Equipment (UE), smart phone, modem, laptop, Personal Digital Assistant (PDA), tablet, mobile terminal, smart phone, laptop embedded equipment (LEE), laptop mounted equipment (LME), Universal Serial Bus (USB) dongles, machine type UE, UE capable of machine-to-machine (M2M) communication, etc., or a sensor or actuator that is able to wirelessly send and receive data and/or signals to and from a network node. The electronic transceiver device 300 comprises a transceiver which at least comprises a receiver 301 connected to an antenna arrangement 301a to be able to receive signals transmitted from a network node of a cellular communication system. The network node is arranged to transmit control information by repeatedly transmitting grouped signals comprising the control information. Such a network node is further demonstrated with reference to FIG. 4. The electronic transceiver device 300 further comprises a signal processor 302 and a memory 304. The electronic transceiver device 300 may comprise further elements for fulfilling tasks usually existing in any of the example devices demonstrated above, such as user interface, signal interfaces, power circuits, etc., but since this is commonly known features and not influencing the disclosure, a further discussion thereabout is not provided not to obscure the main contribution of this disclosure.

Figure 4:
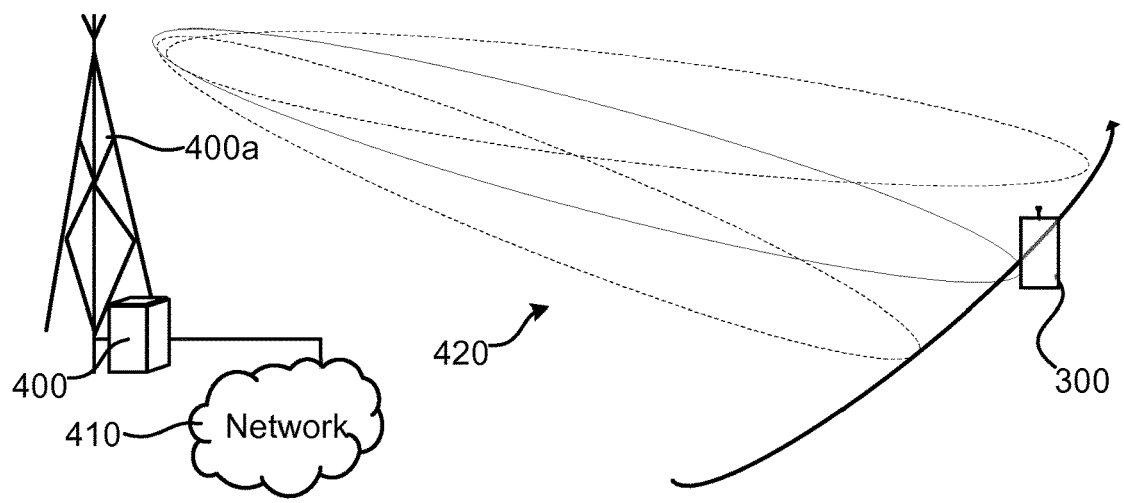
FIG. 4 is an illustration of a network node of a cellular communication system.

FIG. 4 illustrates a network node 400 connected with backhaul to a network 410, e.g. a core network or the Internet. The network node 400 operates a cell, which has a certain assumed coverage. The coverage may be accomplished by consecutively providing beams 420, e.g. by directional antennas such as an array antenna, providing a pattern as for example illustrated in FIG. 5 covering the assumed area, as illustrated in FIG. 4, or by continuously providing transmissions covering the assumed area, e.g. by an omnidirectional antenna. An electronic transceiver device 300 operating at or close to the edge of the assumed area may experience difficulties with successfully receiving signals provided by the network node 400, and it is within that context the discussions below will be made.

The receiver 301 is arranged to receive signals from the network node 400, in which groups of signals are repeating at least a part of the control information. When the electronic transceiver device 300 is on a distance from the network node where the transmissions are close to their maximum range, the electronic transceiver device may be able to decode the first signal, e.g. PSS and SSS, but not the second signal, e.g. PBCH, due to the first signal having greater robustness in modulation and/or coding. The coverage, seen in an ideal environment, exemplified by a beam, may thus look like illustrated in FIG. 6 where the first signal is decodable within a larger area 602 than the second signal which is only successfully decoded within a smaller area 604. A similar problem may occur if the electronic transceiver device happens to be between provided beams where respective areas 604 of the beams fail to cover but the areas 602 may overlap.

Figure 7:
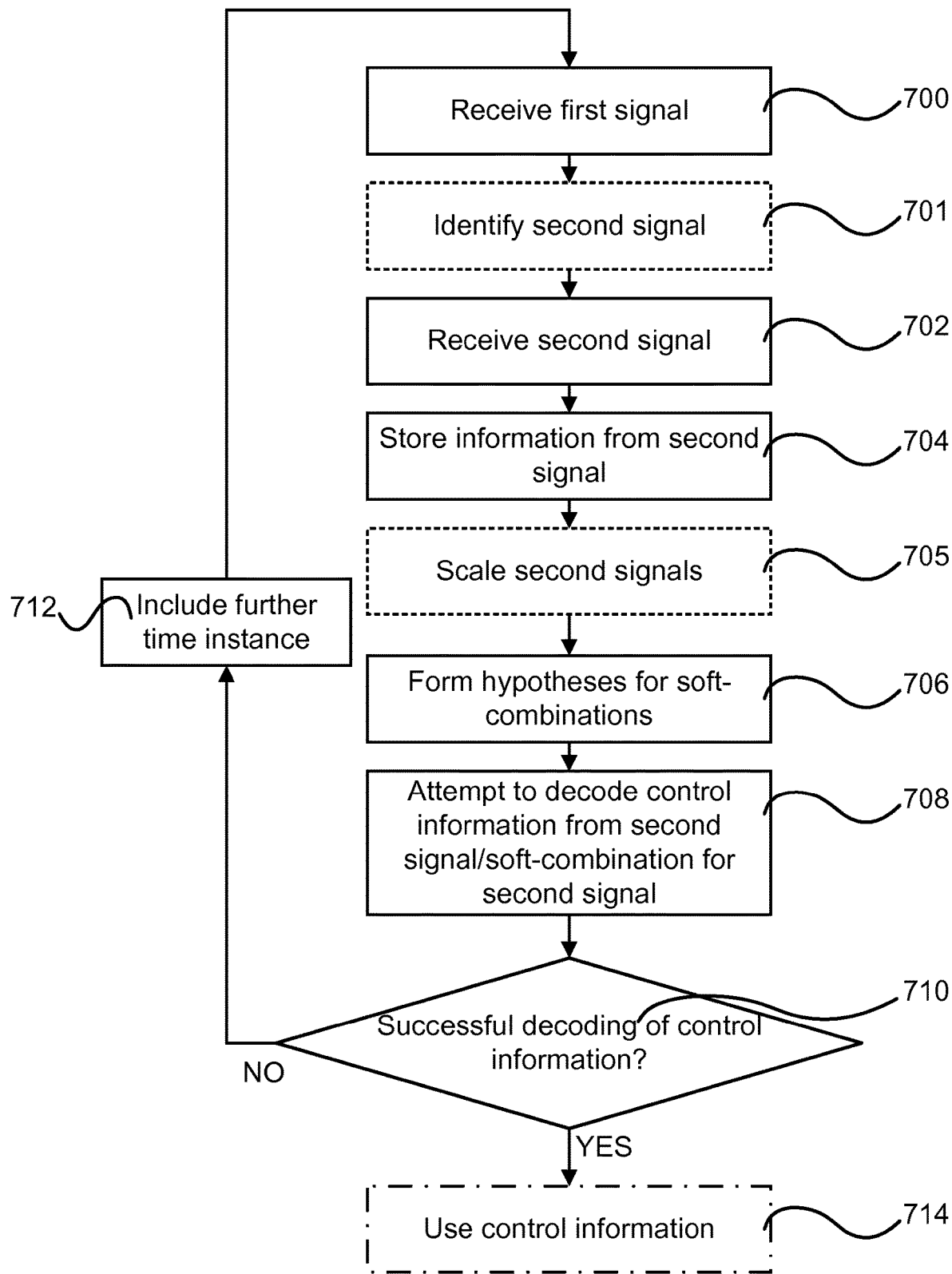
FIG. 7 is a flow chart illustrating a method according to an embodiment.

FIG. 7 is a flow chart illustrating a method according to embodiments. In the flow chart, optional actions are indicated with dashed boxes and odd number reference numerals. Furthermore, the dot-dashed box 714 indicates an action that is not really part of the contribution of this disclosure, but is indicated to put the contributing actions into context. The method is performed by an electronic transceiver device which is arranged to operate in a cellular communication system. The cellular communication system is assumed to have a network node arranged to transmit control information by repeating at least a part of the control information at different time instances, e.g. as demonstrated with reference to FIGS. 1 and 2. The flow chart is illustrated as a loop, which represents the reoccurring time instances.

The method includes receiving 700 signals from the network node, which signals includes the signals comprising the control information. The signals comprise a first signal and a second signal, e.g. as demonstrated with reference to FIG. 1, i.e. grouped at repeating time instances. As also demonstrated above, the first signal may be easier decodable at harsh situations, wherein information from the decoded first signal at such situations may enable identifying 701 the second signals when the receiver is able to decode at least the first signal. That is, when the second signal is not fully decodable, but the first one is, e.g. as demonstrated with reference to FIG. 6, the second signal can be identified 701, received 702 and stored 704 anyway.

Thus, the receiving of the signals comprises receiving 700, 702 the first signal and the second signal provided at a first time instance, then and receiving 700, 702 the first signal and the second signal at a second time instance when 710, 712 successful decoding of desired control information from the second signal was not able at the first time instance By storing 704 at least information received in the second signals and forming 706 hypotheses of differences in the received information at the first and second time instances of the second signals wherein control information carried by the second signals are attempted to be decoded 708 upon a hypothesis indicating successful soft-combining of the second signals of the first and second time instances. The soft-combining may include two or more time instances. For example, it is determined 710 whether information of the second signal is decodable from the combination of the second signals of the first and second time instances, and if not, a further time instance is included 712, which leads to receiving 700, 702 a first signal and a second signal provided at a further time instance and forming 706 hypotheses of differences in the received information at the first, second and further time instances of the second signals for the soft-combining of the information of the second signals. The determining 710 of whether decoding of the information of the second signal is enabled from the second signals at the first and second time instances may be based on a check sum.

Figure 1:
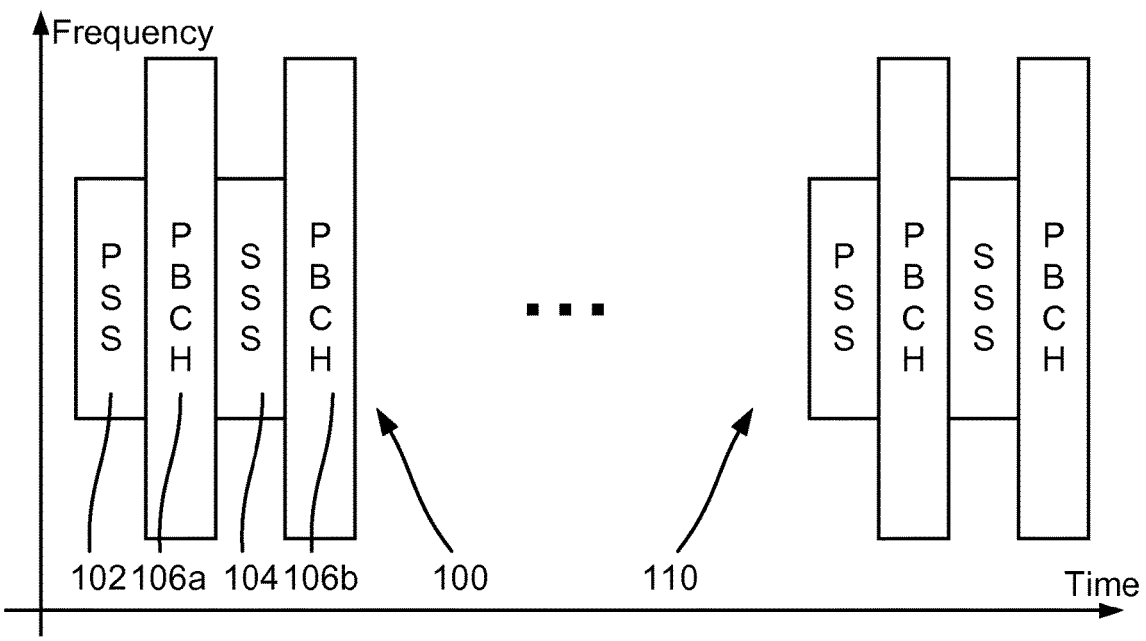
FIG. 1 schematically illustrates provision of PSS, SSS and PBCH in an SSB.
Figure 2:
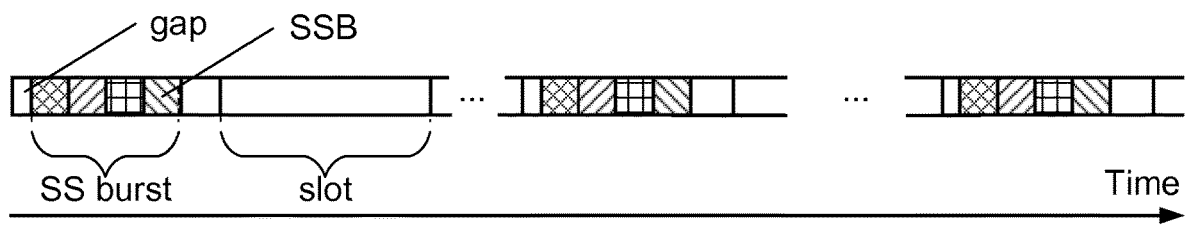
FIG. 2 schematically illustrates SSBs as provided in SS bursts.

As demonstrated with reference to FIGS. 1 and 2, each of the first and second time instances may correspond to a reception of a synchronisation signal block, the first signal may be a primary synchronisation signal or a secondary synchronisation signal, and the second signal may be a physical broadcast channel.

Figure 8:
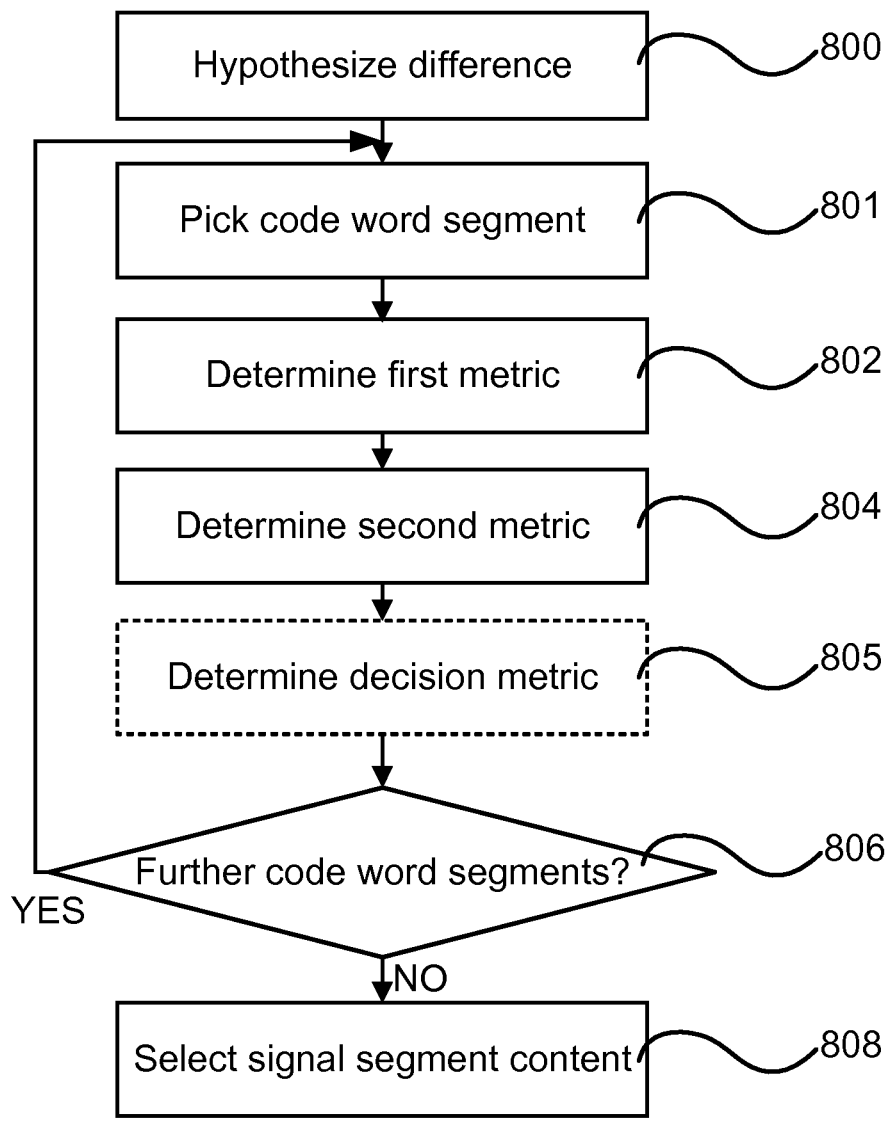
FIG. 8 is a flow chart illustrating forming and evaluating of hypotheses according to an embodiment.

The forming 706 of the hypotheses may comprise hypothesizing a difference between information of the two or more of the plurality of the second signals, for example as will be demonstrated further with reference to FIG. 8. Forming 706 of the hypotheses of differences in the received information of second signals for soft-combining the information of the second signals may comprise inverting and soft-combining the information according to a hypothesis dependent pattern.

For proper and/or easier combining, scaling 705 the respective second signals may be applied prior combining. The scaling may be based on for example a reception quality metric of the received second signal, estimated channel for the received second signal, etc.

Above, the optional step of identifying 701 the second signal from decoded first signal has been demonstrated. The principle of identifying signals to be received from one or more successful decoding of signals can also be applied in a wider sense. For example information from the decoded first signal at one time instance can be used for enabling identifying of other time instances when the first signal and the second signal are transmitted, where knowledge of periodicity of time instances and grouping of the signals at the repeating time instances is used.

Figure 5:
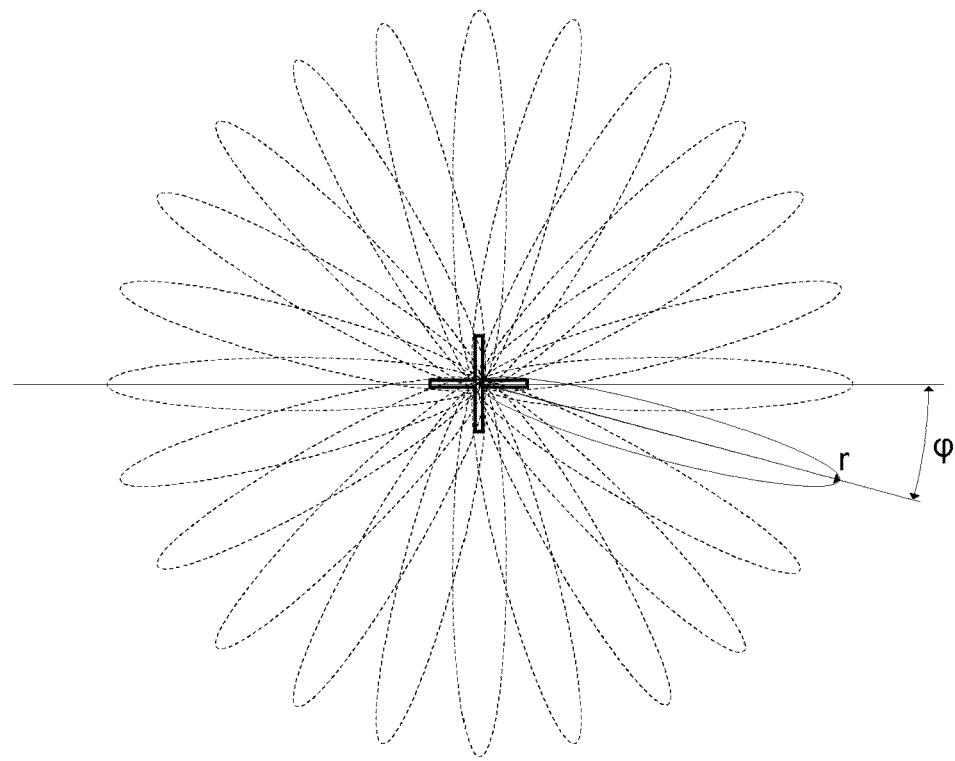
FIG. 5 is a top view of a network node which provides beams with range r in different directions $\varphi$ to sweep the coverage area of the network node.
Figure 6:
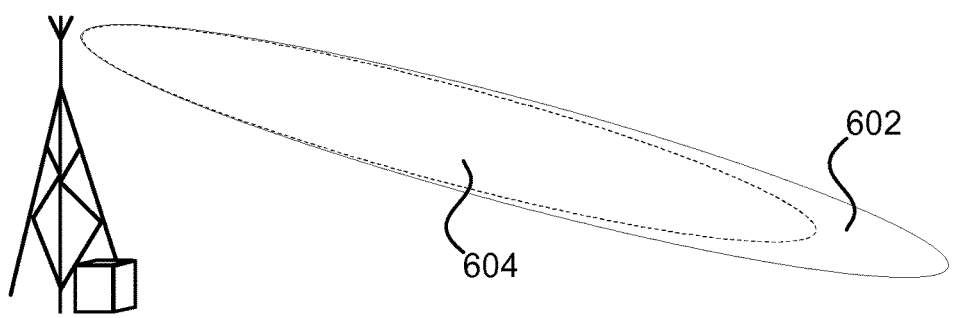
FIG. 6 is a schematic illustration of a network node providing a beam having different coverages for different types of signals.

The receiver of the electronic transceiver device may receive the signals comprising the control information from beams swept consecutively over a coverage area of the network node, wherein the time instances may be from different beams, i.e. covering adjacent areas as demonstrated with reference to FIGS. 4 and 5, and/or a beam covering a particular area as demonstrated with reference to FIG. 6, i.e. where the electronic transceiver device is located, for each time the beam is provided over that particular area. Thus, the time instants may be periodic, i.e. from each time the beam is pointed towards the electronic transceiver device, adjacent, i.e. from two beams approximately pointing in the direction of the electronic transceiver device, or any combination thereof, i.e. from any beam from which information may be gathered.

Here, the optional actions of storing information from all of the first and second time instants and possible further time instants enable processing at arbitrary time provides for enabling the wireless transceiver device to continue receiving signals from further time instants simultaneous with processing already received signals. Thus, the sequential nature illustrated by the flow charts should be interpreted accordingly, i.e. receiving steps 701, 702 may be repeated before or simultaneous with the processing of previously received signals. That is, the methods may be performed on a real-time basis rather than sequentially as inherently showed by a flow chart.

For the sake of easier understanding, the forming of hypotheses and decoding has in FIG. 7 been illustrated on a rough level. The skilled reader will understand that the decoding is interleaved with the forming and evaluation of the respective hypotheses. The actual forming of the hypotheses and evaluation thereof may for example rely on statistical parsing, e.g. utilizing a Viterbi algorithm for achieving a maximum-likelihood performance. FIG. 8 is a flow chart schematically illustrating forming and evaluating of a hypothesis.

A difference between the first and second instances of the second signal is hypothesized 800. The difference may be one or more symbols of the first instant differing from corresponding symbols of the second instant. The difference may alternatively or additionally be that the one or more symbols of the first and second instants use different scrambling codes. Metrics for different possible code words are determined, i.e. decoding is performed for each code word segment. This includes that a code word segment is picked 801, and for that a first metric of a first code word is determined 802 and a second metric of a second code word is determined 804. Here, for the sake of simplicity and easier understanding of the text, the terms "first metric" and "second metric" are used, but they may each comprise a set of one or more metrics. The first metric is associated with a probability that the code word segment of the received first code word corresponds to a first signal segment content. The second metric may be associated with a probability that the code word segment of a received second code word of the second signal corresponds to the first signal segment content conditional on the difference between the first signal and the second signal. A decision metric may be determined 805, which is based on the first and second metrics. The decision metric may be acquired by observing the first and second metrics for respective path, i.e. the decision metric is given by the algorithm, e.g. by a Viterbi decoder, for the path. According to some embodiments, the second metric may be determined 804 independently of the first metric, wherein the decision metric is determined 806 over combinations of the first and second metrics, i.e. for feasible transition likelihoods. If further code word segments are present 806, the procedure of processing each of them continues. When all code word segments are parsed, a signal segment content is selected 808 based on the metrics, i.e. the first and second metrics, or on the decision metric. The signal segment content is selected, based on the metrics, i.e. the first and second metrics, or on the decision metric, among the first signal segment content or a second signal segment content, for the first signal, or for the second signal the first signal segment content or the second signal segment content, for the soft-combining. It is then possible to determine whether the soft-combining is successful based on the metrics. The forming and evaluating of hypotheses may be performed on a plurality of time instants of the second signals, on which information may have been stored, i.e. not just the first and second time instants, but the principle above still applies.

The above is based on an approach for decoding of codes that may be represented via a state machine. The approach is particularly useful when decoding two code words with a hypothesized, e.g. known, difference. For example, the approach may include joint Viterbi decoding of blocks, i.e. code words, with unknown content but known difference, but is not limited to a Viterbi decoder. For example, a modification of the Viterbi decoder that allows joint decoding of code blocks (i.e. code words) containing the same unknown information may be used, but where it is known that some symbols, e.g. bits, at known positions are toggled, e.g. flipped from 0 to 1, and vice versa. This allows the desired control information to be decoded using blocks from different, e.g. adjacent, beams. Hence, redundancy can be achieved by collecting blocks from multiple beams. The branch metrics for the two or more jointly decoded blocks, i.e. code words, may be combined in a manner that takes the toggled bits into account. Typically, each control signal instance is decoded separately, but the decisions on the most likely path through each respective trellis is based on the combined information from all jointly decoded blocks.

Each state of the Viterbi decoder represents the most recent bits in the code block. It is realized that by concatenating a toggle bit pattern and an associated check sum, every state in the decoding of the second code block to the corresponding state in the decoding of the first code block. This allows the so called path metrics, which is a central concept of the Viterbi algorithm and which is to be minimized or maximized, depending on the type of metric used in the decoding, in order to find the transmitted message with maximum likelihood, to be combined when deciding which previous nodes to select as inputs to the current ones.

A Viterbi algorithm typically contains the following elements:
A Path Metrics Unit (PMU), dynamically connecting nodes, i.e. states for different output bits, and
A Traceback Unit (TBU), converting a sequence of state transitions into binary 0s and 1s or a soft representation thereof.
The PMU further comprises:
A Branch Metrics Unit (BMU), where given a received code word segment and a particular node, i.e. state, and two branching words, each associated with a separate next node, i.e. subsequent state, a cost in terms of distance between the received code word segment and a branch word is calculated, where distance may refer to any of the non-limiting examples:
Hamming distance, in case of 'hard' decoding where input to algorithm is binary values, or
Euclidean distance, in case of 'soft' decoding where input to algorithm is mapped to values in, for instance, the range [0,7], where 0 is a strong binary 0 and 7 is a strong binary 1, and where 3 and 4 are weak 0s and 1s, respectively
An Add-Compare-Select Unit (ACS), where path metric is calculated for each of the potential input nodes (previous states, in this example there are up to two potential input nodes) to each node (state) representing a next node (subsequent state) wherein for each potential input the path metric at that particular node (previous state) is added to the branch metric for transition from that particular node to this next node (subsequent state); where calculated path metrics are compared; and where the input node associated with the smallest path metrics is selected as the input node to this particular next node.

The inputs to the algorithm are two code blocks, i.e. first and second code words, and a toggle pattern, i.e. a difference, known or at least hypothesized.

For each pair of received code word segments a state-toggle mask may be defined based on the input toggle pattern, where bits are read out, e.g. by a modulo operation, and where the MSB (most significant bit) is the left-most bit.

In the ACS unit, path metrics (first and second metrics) are calculated and maintained independently of each other for the two code blocks, but when comparing and deciding which input to take, the metrics may be combined, e.g. added, over the nodes to produce the decision metric.

Depending on the state-toggle pattern for the previous code word segment, the order of the path metrics for the two potential input nodes may have to be shifted for metrics related to the second code block before adding them to corresponding metrics for the first code block.

For each node, the input node associated with the smallest path metrics is selected.

Generally, decoding may be achieved using any suitable approach or algorithm for decoding of state machine representable codes. For example, the decoding approach may apply trellis decoding, sequential decoding, iterative decoding, the Viterbi algorithm, the Bahl-Cocke-Jelinek-Raviv (BCJR) algorithm, the Fano algorithm, the stack algorithm, the creeper algorithm, turbo decoding, and/or suboptimal versions of these approaches (such as sliding window decoding, list decoding, etc.).

In some examples, e.g. if a decoding approach based on a trellis representation of the code such as the Viterbi algorithm is used, determining the first metric may be associated with a probability of a particular state transition conditional on the code word segment of the received first code word.

The first metric may, for example, be a Hamming distance or a Euclidean distance between the code word segment of the received first code word and a code word segment corresponding to the first message segment content, e.g. a code word segment of a branch in a trellis representation of the code. Alternatively, the first metric may be the soft values achieved after the iterations of a turbo decoder, or any other suitable metric.

Figure 9:
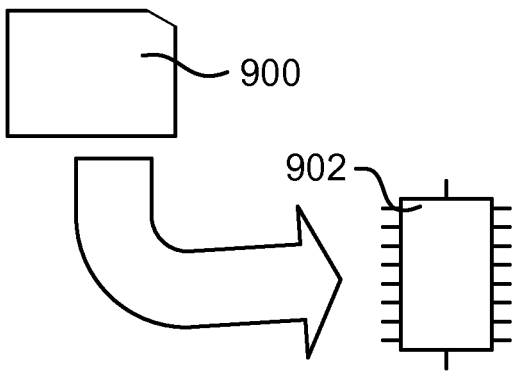
FIG. 9 schematically illustrates a computer-readable medium and a processing device.

The methods according to the present disclosure is suitable for implementation with aid of processing means, such as computers and/or processors, especially for the case where the signal processor 302 demonstrated above with reference to FIG. 3 comprises a processor handling the operations demonstrated herein. Therefore, there is provided a computer program, comprising instructions arranged to cause such processing means, processor, or computer to perform the steps of any of the methods according to any of the embodiments described herein, and with option to perform forming and evaluation of hypotheses as described with reference to FIG. 8. The computer program preferably comprises program code which is stored on a computer readable medium 900, as illustrated in FIG. 9, which can be loaded and executed by processing means, processor, or computer 902 to cause it to perform the methods, respectively, according to embodiments of the present disclosure, preferably as any of the embodiments described herein. The computer 902 and computer program product 900 can be arranged to execute the program code sequentially where actions of the any of the methods are performed stepwise, or on a real-time basis as discussed above. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

The invention claimed is:

1. An electronic transceiver device arranged to operate in a cellular communication system, where the cellular communication system has a network node arranged to transmit control information by repeating at least a part of the control information, wherein the electronic transceiver device comprises:
   a receiver arranged to receive signals from the network node including signals comprising the control information, said signals comprising a first signal and a second signal grouped at repeating time instances;
      wherein information from the decoded first signal enables identifying the second signals when the receiver is able to decode at least the first signal, and
      wherein the receiver is configured to receive the first signal and the second signal provided at a first time instance, and to receive the first signal and the second signal at a second time instance;
   a memory arranged to store at least information received in the second signals; and
   a signal processor arranged to:
      form hypotheses of differences in the received information at the first and second time instances of the second signals for soft-combining the information of the second signals; and
      upon a hypothesis indicating successful soft-combining of the second signals of the first and second time instances, decode control information carried by the second signals,
   wherein the electronic transceiver is configured to detect that the first signal was successfully decoded when the second signal was not successfully decoded, and in response to the detection to perform:
      using the information from the decoded first signal to identify the second signal; and
      storing the identified second signals for use when forming the hypotheses of differences in the received information at the first and second time instances of the second signals.

2. The electronic transceiver device of claim 1, wherein each of the first and second time instances corresponds to a reception of a synchronisation signal block, the first signal is a primary synchronisation signal or a secondary synchronisation signal, and the second signal is a physical broadcast channel.

3. The electronic transceiver device of claim 1, arranged to determine if information of the second signal is decodable from the combination of the second signals of the first and second time instances, and further arranged to receive a first signal and a second signal provided at a further time instance by the network node and form hypotheses of differences in the received information at the first, second and further time instances of the second signals for soft-combining the information of the second signals if determined that information of the second signal is not decodable from the second signals at the first and second time instances.

4. The electronic transceiver device of claim 3, wherein determination of whether decoding of the information of the second signal is enabled from the second signals at the first and second time instances is based on a check sum.

5. The electronic transceiver device of claim 1, wherein the signal processor is arranged to form the hypotheses by being configured to:
   hypothesize a difference between information of the two or more of the plurality of the second signals, the difference being one or more symbols of the second signals differing from corresponding symbols of the other second signals;
   decode the second signal by, for each code word segment of a received code word of the second signals, being arranged to:
      determine a first metric associated with a probability that a first code word segment of a first received code word corresponds to a signal segment content;
      determine a second metric associated with a probability that a second code word segment of a received second code word of the second signal corresponds to the first signal segment content conditional on the difference between the second signals; and
   select, for the second signal, the first signal segment content or the second signal segment content based on the metrics, for the soft-combining, wherein a determination whether the soft-combining is successful is based on the metrics.

6. The electronic transceiver device of claim 1, wherein the signal processor is arranged to form the hypotheses of differences in the received information of second signals for soft-combining the information of the second signals by being arranged to invert and soft-combine the information according to a hypothesis dependent pattern.

7. The electronic transceiver device of claim 1, wherein the respective second signals are scaled prior combining, wherein the scaling is based on at least one of:
   a reception quality metric of the received second signal; and
   estimated channel for the received second signal.

8. The electronic transceiver device of claim 1, wherein information from the decoded first signal at one or more time instances comprising at least the first time instance enables identifying other time instances when the first signal and the second signal are transmitted grouped at the repeating time instances.

9. A method performed by an electronic transceiver device arranged to operate in a cellular communication system, where the cellular communication system has a network node arranged to transmit control information by repeating at least a part of the control information, wherein the method comprises:
   receiving signals from the network node including signals comprising the control information, said signals comprising a first signal and a second signal grouped at repeating time instances, wherein information from the decoded first signal enables identifying the second signals when the receiver is able to decode at least the first signal, and wherein the receiving of the signals comprises:
      receiving the first signal and the second signal provided at a first time instance;
      receiving the first signal and the second signal at a second time instance;
      detecting that the first signal was successfully decoded when the second signal was not successfully decoded, and in response to the detection using the information from the decoded first signal to identify the second signal;
      storing at least information received in the identified second signals;
      using the stored identified second signals to form hypotheses of differences in the received information at the first and second time instances of the second signals for soft-combining the information of the second signals, and decoding control information carried by the second signals upon a hypothesis indicating successful soft-combining of the second signals of the first and second time instances.

10. The method of claim 9, wherein each of the first and second time instances corresponds to a reception of a synchronisation signal block, the first signal is a primary synchronisation signal or a secondary synchronisation signal, and the second signal is a physical broadcast channel.

11. The method of claim 9, comprising:
determining if information of the second signal is decodable from the combination of the second signals of the first and second time instances;
receiving a first signal and a second signal provided at a further time instance;
forming hypotheses of differences in the received information at the first, second and further time instances of the second signals for soft-combining the information of the second signals if determined that information of the second signal is not decodable from the second signals at the first and second time instances.

12. The method of claim 11, wherein the determining of whether decoding of the information of the second signal is enabled from the second signals at the first and second time instances is based on a check sum.

13. The method of claim 9, wherein the forming of the hypotheses comprises:
hypothesizing a difference between information of the two or more of the plurality of the second signals, the difference being one or more symbols of the second signals differing from corresponding symbols of the other second signals;
decoding the second signal for each code word segment of a received code word of the second signals, wherein the decoding comprises:
determining a first metric associated with a probability that a first code word segment of a first received code word corresponds to a signal segment content;
determining a second metric associated with a probability that a second code word segment of a received second code word of the second signal corresponds to the first signal segment content conditional on the difference between the second signals; and
selecting, for the second signal, the first signal segment content or the second signal segment content based on the metrics, for the soft-combining, wherein a determination whether the soft-combining is successful is based on the metrics.

14. The method of claim 9, wherein the forming of the hypotheses of differences in the received information of second signals for soft-combining the information of the second signals comprises inverting and soft-combining the information according to a hypothesis dependent pattern.

15. The method of claim 9, comprising:
scaling the respective second signals prior combining, wherein the scaling is based on at least one of:
a reception quality metric of the received second signal; and
estimated channel for the received second signal.

16. The method of claim 9, wherein information from the decoded first signal at one or more time instances comprising at least the first time instance enables identifying other time instances when the first signal and the second signal are transmitted grouped at the repeating time instances.

17. A non-transitory computer readable storage medium comprising instructions which, when executed on a processor of an electronic transceiver device, cause the electronic transceiver device to perform a method, wherein the electronic transceiver device is arranged to operate in a cellular communication system, where the cellular communication system has a network node arranged to transmit control information by repeating at least a part of the control information, wherein the method comprises:
receiving signals from the network node including signals comprising the control information, said signals comprising a first signal and a second signal grouped at repeating time instances, wherein information from the decoded first signal enables identifying the second signals when the receiver is able to decode at least the first signal, and wherein the receiving of the signals comprises:
receiving the first signal and the second signal provided at a first time instance;
receiving the first signal and the second signal at a second time instance;
detecting that the first signal was successfully decoded when the second signal was not successfully decoded, and in response to the detection using the information from the decoded first signal to identify the second signal;
storing at least information received in the identified second signals;
using the stored identified second signals to form hypotheses of differences in the received information at the first and second time instances of the second signals for soft-combining the information of the second signals, and
decoding control information carried by the second signals upon a hypothesis indicating successful soft-combining of the second signals of the first and second time instances.

* * * * *